United States Patent Office 2,866,674
Patented Dec. 30, 1958

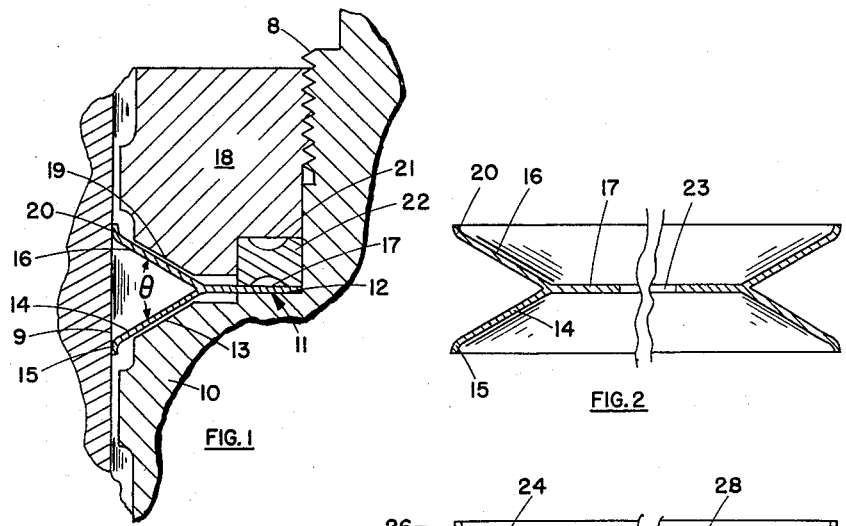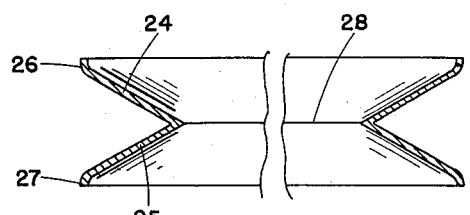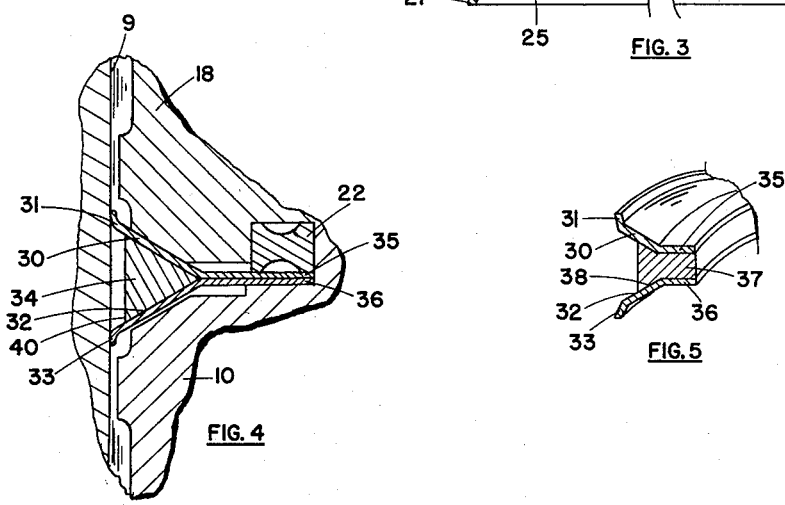

2,866,674
DOUBLE ACTING PISTON SEAL

Charles E. Hamlin, Whittier, Calif., assignor to North American Aviation, Inc.

Application January 12, 1956, Serial No. 558,704

4 Claims. (Cl. 309—33)

The present invention is directed to a double acting seal for a movable piston. More particularly, the invention concerns a dynamic piston seal suitable for the high pressure operation of hydraulic actuators at elevated temperatures.

Heretofore dynamic piston seals have been made using an O-ring or reed type construction. These seals have been deficient when attempts are made to use them in high pressure systems at elevated temperatures. The O-ring seals contain elastomeric material which is not heat resistant and/or incompatible with hydraulic fluids while the reed seals have unacceptable leakage rates at high pressures. The use of nested metal cups with split offset spring fingers for flexibility have also been proposed as sealing elements. Such cups, however, have failed since the knife edges associated therewith have been subjected to galling and subsequent leakage at the bearing surface of the piston and cylinder bore as well as between the split spring fingers.

The essence of this particular invention is in providing a pair of cylindrical spring beam elements diverging from each other outwardly from the piston and bent tip portions of still greater divergence which are adapted for an interference fit with the walls of the cylinder bore. In operation, pressure developed on either side of the piston assembly serves to expand the bent tip against the cylinder wall and pressure against the cantilevered beam element tends to rotate the bent tip into the cylinder wall. Thus, even though the oil or other hydraulic fluid in the piston device becomes extremely thin under heat, the pressure causes the bent tip portion into tighter contact with the cylinder wall. The higher the pressure in the cylinder the more positive becomes the seal. The beam element and tip portion must have sufficient surface area exposed to the pressure to accomplish the above purposes. Means is also provided in the present invention to prevent chattering of the beam element and bent tip on the low pressure side of the seal as it is moved toward the low pressure side. Means is also provided to adjust the effective cantilevered length of the beam elements to adapt the seal to optimum operation at various pressures. In addition, the invention includes a combination of reciprocating piston and seal with both dynamic and static sealing means.

An object of this invention is to provide a new and improved piston and seal combination.

A further object of this invention is to provide a double acting metal piston seal.

A still further object of this invention is to provide a new and improved metal seal.

An additional object of this invention is to provide a metal seal adjustable for optimum operation at various pressures.

Another object of this invention is to provide a hydraulic actuator seal.

A further object of this invention is to provide a simple, easily assembled piston seal.

A still further object of this invention is to provide a high pressure seal operable at high temperatures.

Other objects of invention will become apparent from the following description taken in connection with the accompanying drawings, in which Fig. 1 is a cross sectional view of the over-all piston seal;

Fig. 2 is a cross section of the metal seal per se;

Fig. 3 is a modified metal piston seal per se;

Fig. 4 is a cross sectional view of a portion of the piston seal showing means to adjust the length of the beam elements;

And Fig. 5 shows a modified adjusting means in combination with a metal seal per se.

Fig. 1 shows a typical use of the double acting metallic seal of this invention. The seal itself extends outwardly on an annular ridge 11 around the periphery of a main piston portion 10. The piston portion 10 reciprocates within a cylinder bore and is spaced from the wall 9 of this cylinder bore a distance normally of from 0.001–0.002 inches to allow the piston itself to take some of the normal end play. The annular ridge has a tapered portion 13 on the bottom thereof. This tapered surface may be machined directly into the piston portion 10, as shown, or may be a separate washer-like member inserted onto the annular ridge 11. The metal seal per se comprises a pair of diverging spring beam elements 14 and 16, one of which, denoted as 14, rests on the tapered surface 13. As shown in Fig. 1, the metal seal per se has a tail portion 17 resting on a horizontal portion 12 of the piston 10 and a second beam element 16 diverging from the first beam element 14 by an angle θ. The diverging beam elements have bent top portions 15 and 20 respectively, which are adapted for sliding tangential contact with the inner wall 9 of the cylinder bore. Normally, the outside diameter of the bent tips will be from 0.002–0.003 inches greater in diameter than the inside diameter of the cylinder bore in order to give an interference or compression fit. This affords adequate contact force for static or low pressure sealing. The outer periphery of the bent tip portions are normally ground after forming to an angle of from 1° to 3° to provide an outward taper. A means 18 is provided for clamping the metal seal in place and to provide a tapered surface 19 corresponding to the tapered surface 13 to prevent chattering of the bent tip 20 when the beam element 16 is on the low pressure side of the piston. The means 18 is shown as a cylindrical nut which serves to clamp the dynamic metal seal in place as well as to statically seal the tail portion on either side of the metal seal. The later operation is accomplished by a squash ring 22 which is made of a relatively soft metal, such as brass, which sits in notch 21 and seals the tail 17 of the metal seal against leakage.

The angle θ should be from approximately 40° to 80° for optimum operation. Such angle provides a minimum angular orientation which insures that the lip portion rotates into the wall rather than being moved merely tangentially thereto. The increase of the angle θ to a value greater than that indicated leads to a construction in which the unsupported beam length is of such a span as to bow in when subjected to pressure. This has a tendency to lift the bent tip from the surface rather than to rotate it into the surface as when the beam element acts as a stiff beam. In operation, the outer halves of the bent tip portions are in engagement with the cylinder side walls.

Fig. 2 shows a Y-shaped metal seal per se. Aperture 23 is provided centrally of the seal for slipping the seal over a threaded section 8 of the piston 10. It is to be realized that the particular piston and nut configurations shown are not critical in the use of the metallic seal per se.

Fig. 3 is a modified version of the metal seal per se, in which the seal consists of a pair of beam elements 24 and 25 with bent tip portions 26 and 27, respectively. In cross section, the beam elements approximate a V-shape. An aperture 28 is provided internally of the seal for assemblage over a central piston portion.

Fig. 4 shows means in the form of a cylindrical filler ring 34 to adjust the effective cantilevered lengths of the beam elements to adapt a seal for optimum operation at various pressures. As in Fig. 1, it is preferred that the piston portion 10 and nut portion 18 have tapered surfaces thereon to prevent chattering on the low pressure side of the piston. The cylindrical filler ring 34 is of triangular cross section and has legs abutting beam elements 30 and 32 of the seal. The beam elements 30 and 32 have bent tip portions 31 and 33 and separate tail portions 35 and 36. The tail portions are held against each other and the beam elements held against the abutting sides of the filler ring 34 by the pressure of nut 18 screwed down on to the piston portion 10 and the action of the squash ring 22. The particular length of the abutting edges of the filler ring 34 is dependent upon the pressure at which the piston combination is to be operated. For high pressure sealing, such as 5000 p. s. i., the outside diameter of the filler ring is generally at a maximum and allows for maximum flexibility of the beam element between the edge 40 of the filler ring and the bent tip portion of the beam element without collapsing the seals. The juncture of the edge 40 and the edge of the filler ring abutting the beam element acts as a fulcrum for rotating of the cantilevered beam portion into the cylinder bore wall. At pressures approximating 1500 p. s. i., no filler ring is necessary, the fulcrum point of the beam elements thus being the root portion at the tail 17, while at 3000 p. s. i., a filler ring having an outside diameter less than that shown should be used. The actual diameter of the filler ring determines the effective length of the abutting edges of the filler ring and the beam elements and is dependent on the particular pressure to be exerted on the beam elements.

Fig. 5 is a modified filler ring assembly in which the filler ring has a tapered surface 38 parallel to the beam elements 30 and 32. The length of the contact between these tapered surfaces and the surface of the beam elements determines the fulcrum point of the beam element and is dependent on the particular design pressure, as explained in the paragraph above. The filler ring shown in Fig. 5 has a rectangular portion 37 which separates the tail portions 35 and 36 of the metal seal 6. It is to be realized that these elements may be statically clamped as shown in Figs. 1 and 4.

The sealing action of the metal seals described above is of such a nature that the bent tip portions or lips are forced against the side walls of a cylinder bore by inherent compression, by pressure acting on the surface thereof, and by forces acting on the beam elements which tend to rotate the tip portions into the cylinder wall. When using this seal, it is preferred that the walls of the cylinder have a surface finish of from 4-8 micro inches R. M. S. Hard chrome plating or the nitriding of a nitralloy bore have been found to be appropriate to provide a hard but ductile surface on the cylinder walls. The metal seal is normally made of a steel that is flexible in thin cross sections.

Table I shows a series of tests which were made on various of the metallic seals of this invention. It is to be noted that the total leakage of these seals was appreciably less than that allowed in military specifications.

Table I

| | 1 | 2 | 3 |
|---|---|---|---|
| Material | 1095 Steel | 1095 Steel (Annealed) | 1095 Steel |
| Thickness | 0.010 | 0.016 | 0.016 |
| Bore, I. D | 1.502 | 1.501 | 1.501 |
| Seal, O. D | 1.504 | 1.503 | 1.504 |
| Pressure, p. s. i | 3,000 | 3,000 | 3,000 |
| Temperature, °F | 80 | 375 (ave.) | 500 |
| Cycles | 100,000 | 100,000 | 22,050 |
| Total Leakage, cm.³ | 75.0 | 90.0 | 15.8 |
| Allowable Leaking, cm.³ | 100.0 | 100.0 | 22.05 |

Each of the seal elements were found to be in good condition without evidence of heavy wear, scratching or galling upon completion of the above test runs. Flexibility in the present seal is obtained from spring action on the beam elements and leakage is minimized by providing a seal portion which is unbroken around the periphery. Use of the metal seals of this invention result in a more compact actuator and further minimize machining on the piston surfaces and provide for increased ease in assembly operations.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A combination of a fluid pumping piston and seal for a cylindrical bore comprising a movable piston having a seal receiving annular recess around the periphery thereof, a pair of thin flexible cylindrical spring beam elements mounted in said recess and diverging from each other in substantially straight lines outwardly from said piston, said elements subtending an angle of from 40° to 80°, circular bent tip portions at the end of said elements of greater divergence than said elements being substantially parallel to piston and adapted to contact the cylinder wall, each of said bent tips having a circumferential lip at the edge thereof away from each respective beam elements, each of said elements having a circumferential fulcrum point inward of its end whereby high pressure of the pumped fluid on one of said elements causes the element to bend at said fulcrum point and said lip is rotated outwardly into a tighter seal with the wall of the cylindrical bore.

2. The invention as set out in claim 1 in which a filler ring is placed between and in contact with at least a portion of said beam elements.

3. The invention as set out in claim 2 in which part of said filler ring has a divergence equal to the divergence of said beam elements and an effective length less than the total length of said beam elements, said effective length being dependent on the pressure to be exerted on said beam elements.

4. A single acting piston seal to be used with a piston to pressurize fluid comprising a planer root portion having a circular outer edge, a thin circumferential cantilever beam element diverging in substantially a straight line from said outer edge at an angle of 50° to 70° from the direction of motion of the piston on its compression stroke, a bent tip portion sharply diverging from the end of the said beam element in a direction substantially parallel to said piston direction of motion and adapted to slidably contact a cylinder bore wall, said bent tip having a circumferential lip at the edge thereof away from the beam elements, said root portion being adapted to be engaged by said piston for mounting, said beam element having a circumferential fulcrum point inward of its end at said root portion outer edge whereby the pressure of the pressurized fluid on the element will cause the element to bend at said fulcrum point and said lip is rotated outwardly into a tighter seal with the wall a cylinder bore wall.

References Cited in the file of this patent

UNITED STATES PATENTS

| Re. 16,978 | Joyce | May 29, 1928 |
| 511,423 | Hinckley | Dec. 26, 1893 |
| 1,399,060 | Kelley | Dec. 6, 1921 |
| 1,757,016 | Langdon | May 6, 1930 |
| 2,139,387 | Schweiss | Dec. 6, 1938 |
| 2,226,273 | Westefeldt | Dec. 24, 1940 |
| 2,579,115 | Harrah | Dec. 18, 1951 |
| 2,630,357 | Smith | Mar. 3, 1953 |

FOREIGN PATENTS

| 865,837 | France | June 5, 1941 |